July 1, 1947.  D. J. HINMAN  2,423,147
METHOD AND APPARATUS FOR MANUFACTURING INNER TUBES
Filed Dec. 9, 1944   3 Sheets-Sheet 2
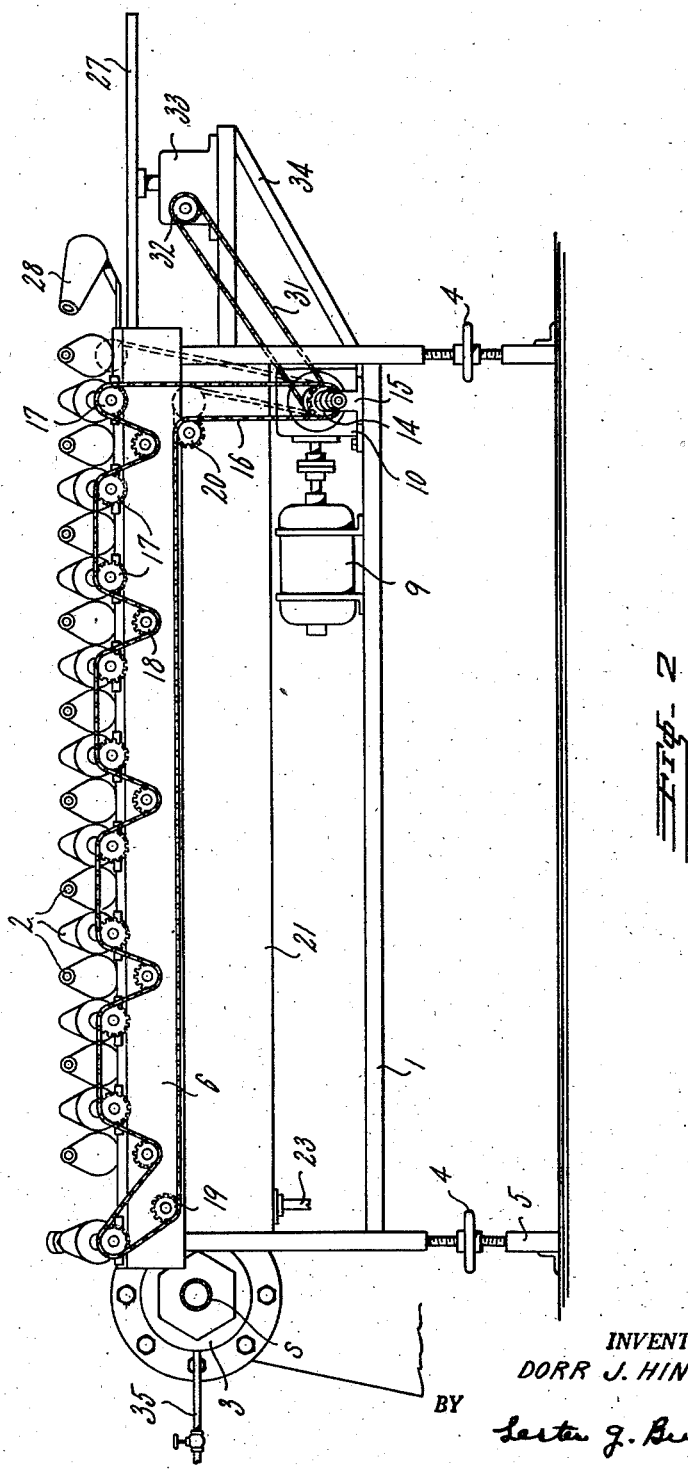
INVENTOR.
DORR J. HINMAN
BY
Lester J. Budlong
ATTORNEY

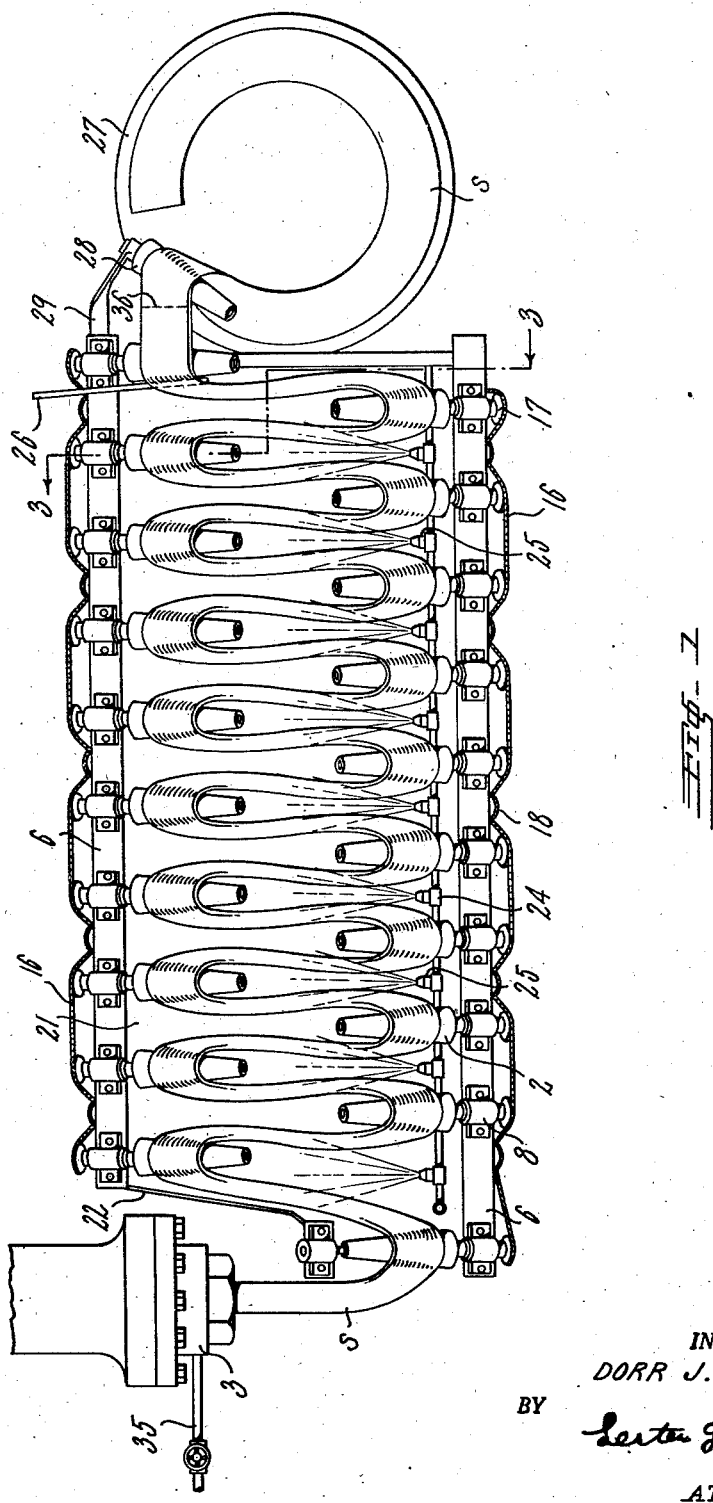

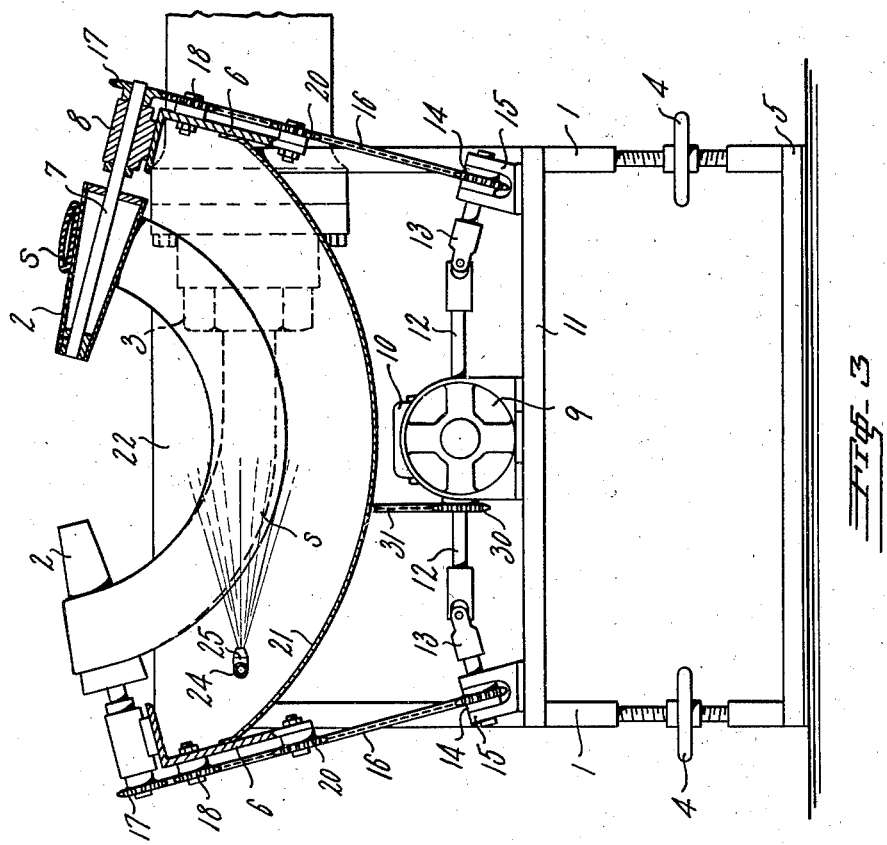

UNITED STATES PATENT OFFICE 2,423,147

METHOD AND APPARATUS FOR MANUFACTURING INNER TUBES

Dorr J. Hinman, Indianapolis, Ind., assignor to United States Rubber Company, New York, N. Y., a corporation of New Jersey Application December 9, 1944, Serial No. 567,382

11 Claims. (Cl. 18—2)

This invention relates to a method and apparatus for manufacturing inner tubes for pneumatic tires and in particular it relates to means for handling and conveying inner tube stock prior to its assembly in the form of a completed annulus.

The conventional method of manufacturing inner tubes consisted of extruding inner tube stock to a shape conforming to a circular outline of the inner tube in cross section. In this condition the tubular stock was extruded in a continuous straight length. Thereafter the tube was cut to proper length and the ends were spliced to form a completed annulus. Directly after the tubular stock was extruded the tube collapsed so that the opposing inner walls of the tube lie in adjacent relationship.

Prior to vulcanization of inner tubes it is necessary to inflate the tube to substantially its normal vulcanized shape. Since inflation of the tube which is now in the shape of an annulus takes place while the rubber stock is in a raw state, the wall of the stock becomes varied due to stretching and compression of the rubber composition. The unvulcanized tube in its uninflated condition is substantially in circular band form as compared with its ultimate inflated annular shape. When air is introduced into an inner tube while in its band state so as to convert it cross sectionally into an annular form, it is obvious that a wide differential occurs in the perimeter of the inner tube at the rim circumference as compared with the tread circumference. This thinning-out of the wall of the tube in the tread region is objectionable in that it leads to premature failure of the tube. There is presently a tendency toward larger cross sectional inner tubes having smaller rim diameters. Under such circumstances the differential between rim and tread perimeters is greatly increased with the result that the thinning out of the tube wall on such inner tubes becomes extremely objectionable.

It has been proposed in some cases to overcome this condition by maintaining extruding dies in such a relationship that the tread portion of the inner tube would result in a heavier wall than the remaining portion of the tube. This, however, was not found satisfactory because greater pressures were required to inflate the raw tube properly and in many case localized thinning out of the wall of the tube in the region of the tread became prevalent. Also it was extremely difficult to maintain uniformity of thickness of the tube wall.

In accordance with the present invention, I extrude inner tube stock and bend the freshly formed tube to an arc of the desired radius and maintain the tube in this arcuate condition while advancing it along a more or less serpentine path so as to cause the tube to assume permanently the approximate curvature of the finished inner tube. The nature of the serpentine path along which the tube stock is advanced is important and preferably is formed by providing a number of power driven rollers in rows disposed at each side of a central vertical plane so that the tube can be laced or draped back and forth between the successive rollers to sag therebetween in connected arcs of the desired curvature. The side walls of the tube are preferably collapsed flat or nearly flat at this time.

The tube is handled in this manner by conveying the tube stock from the extruder over a plurality of driven frustro-conical supporting rollers disposed at opposite sides of a central vertical plane. The inner tube stock is cooled while it is advanced along this approximate serpentine path by the rollers, whereupon the rubber stock becomes sufficiently rigid to permit handling without undue distortion.

By this arrangement the rim and tread portion of the walls of the inner tube become fixed in their raw state so that little or no expansion or compression is required when the inner tube is inflated to normal size. As a result of this operation an inner tube is formed in which the walls of the tube are substantially uniform throughout, for while the tube is bent upon leaving the extruder so that one curved wall will be longer than the other, the thickness of the walls of the tube is found in practice to be uniform for all practical purposes. Apparently the stock upon leaving the extruder flows slightly faster at the outside of the bend of the tube than at the inside of the tube bend to automatically equalize the thickness of these walls.

Among the objects of my invention are to provide an inner tube having a substantially uniform wall thickness; to provide means for handling and maintaining raw tube stock in a more or less serpentine formation; to provide a continuous method of extruding inner tube stock and advancing it along a more or less serpentine path; to provide conveying means for advancing tube stock along an approximate serpentine path and having associate means on which the stock may be measured and cut to proper length to form units capable of being spliced into a completed annulus; and to provide an efficient and economical apparatus for manufacturing tubes as stated.

These and other objects and advantages will appear more fully in the following detailed description when considered in connection with the accompanying drawings illustrating one good practical embodiment of the invention.

In the drawings:

Fig. 1 is a top plan view of apparatus embodying the features of my invention;

Fig. 2 is a side elevational view thereof; and

Fig. 3 is a transverse view in section, taken along lines 3—3 of Fig. 1.

With reference to the drawings, and in particular to Figs. 1 and 2, I show an embodiment of my invention comprising, in part, a structural frame 1 supporting a plurality of driven frustro-conical rollers 2. The frustro-conical rollers are positioned in rows on opposite sides of a vertical central plane in relation to a conventional inner tube extruding head 3 so that the distance between the center of the extruding head and the upper surface of the frustro-conical rollers is substantially equal to the desired radius of the inner tube. When different diameter tubes are desired it is necessary to vary the distance between the extruder head and the frustro-conical rollers. This is accomplished by means of hand wheels 4 located one at each leg of the frame 1 and communicated in complementary threaded relationship with a leg extension member 5. By this provision of manual operation of the hand wheels 4 and associated threaded extension members, the height of the frame may be adjusted in relation to the tuber.

The upper portion of the frame 1 is provided with the horizontally disposed angle rail 6 at each side of the frame. The angle rails as shown in Fig. 3, are positioned to support the frustro-conical rollers 2 so that their axes lie in a path radially of the central longitudinal axis for the arcuate path of the extruded tubular stock S. Each of the frustro-conical rollers is supported by a shaft 7 mounted in a bearing block 8 bolted to the angle rail 6. The frustro-conical rollers are located at spaced intervals along the length of the angle rails 6, and are spaced at equal intervals along each rail but are located in an intermediate position relative to the diametrically opposed set of frustro-conical rollers.

Throughout the conveying operation it is necessary to drive each of the frustro-conical rollers so as to prevent any undue stretch or distortion in the unvulcanized tube. A motor 9 and reduction unit 10 positioned on a cross member 11 forming a part of the frame 1 provides a drive for the rollers 2. A shaft 12 extending towards each side of the frame from the reduction unit 10 has upon each of its ends a universal joint 13 that drives a sprocket 14 supported by a bracket 15 mounted on the cross member 11. This drive sprocket serves to drive a chain 16 that engages with a sprocket 17 keyed to the shaft 7 which supports a roller 2. The same chain 16 engages with similar sprockets 17 for the other rollers 2 along one side of the frame 1.

Between each second roller 2 is an idler sprocket 18 which serves to maintain the chain 16 in proper meshing engagement with the sprockets 17. Idler sprockets 19 and 20 supported by the angle rail 6 complete the path for the chain 16. A similar set of chain and sprockets driven from the same motor 9 is located on the opposite side of the frame 1 for driving the opposite set of rollers 2.

Extending between the angle rails 6 is an arcuate pan 21. The side edges of this pan are attached, as by welding, to the rails 6, and its shape is such as to provide clearance for the inner tube in its arcuate path through the conveying apparatus. The end plates 22 form an enclosure with the bottom portion of the pan 21. The purpose of the pan is to provide means for collecting the water which has been sprayed onto the tube stocks while moving through the conveying apparatus. A drain pipe 23 located at the bottom of the pan permits removal of water collected in the pan.

As the extruded tube leaves the tuber head 3 the rubber composition is relatively hot and consequently is soft and easily distortable. In order to set the rubber to a harder state so that it will withstand a reasonable amount of handling without distortion it is necessary to cool the rubber stock after it leaves the tuber. To accomplish this cold water is sprayed onto the exterior of the tube as it moves progressively through the conveying apparatus.

A water conduit 24 extends within the pan along its length. A number of nozzles 25 are positioned at spaced intervals along the conduit 24 so that a spray of water may be directed against each face of the exterior walls of the inner tube stock. When the tube stock reaches the end of its path over the conveying apparatus it is sufficiently cooled and set for subsequent manual handling. At the end of the conveyor is a compressed air conduit 26 adapted to direct a stream of air from small apertures in the conduit against the surface of the tube so as to remove excess water from the tube.

After the tube stock leaves the conveying apparatus the stock moves onto a horizontally disposed rotatable table 27. An idler conical roller 28 supported from the frame 1 by a bracket 29 operates to guide the tube stock onto the table 27. In some cases the roller 28 may be driven.

As shown in Figs. 2 and 3, the table 27 is driven from the motor 9 by a sprocket 30 mounted on the shaft 12 extending from the reduction unit 10. A chain 31 engaging with the sprocket 30 and a sprocket 32 operates to drive a reduction unit 33 which in turn rotates the table 27. The structural frame 34 extending from the main frame 1 provides a support for the reduction unit 33.

In the operation of the apparatus the conventional tuber 3 is started on its extrusion process and the tube stock S is manually carried up over the first frustro-conical roller 2. Thereafter the end of the tube stock is draped or laced back and forth over alternate rollers 2 until it passes completely through the conveying apparatus. Although the tube stock begins to take a curved path as soon as it leaves the tuber die it is found that it is not necessary to make any change in the tuber die head from its uniform symmetrical construction.

The fact that the tube stock is moved upwardly as it leaves the tuber die head apparently operates automatically to extrude the rubber stock faster at the lowermost portion of the die. This automatically takes care of the uniform thickness in the wall of the tube in both the rim and tread region of the tube.

In order to maintain the shape of the tube and to prevent it from otherwise wrinkling as it moves over the supporting rollers 2 it has been found necessary to inflate, partially, the tube during its cycle of operation. Inflation of the tube is produced by means of a conduit 35 leading from a source of compressed air and which enters the die head and supplies compressed air to inflate the tube directly as the tube is extruded. This partial inflation of the tube prevents a meeting of adjacent walls of the tube and in this way the tube is better adapted to adjust itself as it moves over the supporting rolls. Soapstone is preferably injected into the tube to prevent adhesion between the tube walls, this may be done by forcing it into the tube through a central longitudinal passage in the tuber screw.

When the tube reaches the end of the conveying apparatus it passes around the guide roller 28 and lies in a flat and arcuate position on top of the rotating table 27. Since the movement of the stock is relatively slow an operator has ample time to cut the tube at a point such as at 36 and remove the cut tube to a belt conveyor or some other position for subsequent operation.

It will be seen from the foregoing that by advancing the freshly extruded tube from one driven roller to another disposed at opposite sides of a vertical central plane, the tube may be draped between the rollers in arcs of the desired curvature. In this manner the weight of the tube between spaced rollers is utilized to cause it to drape or sag in the desired arcuate curvature as it is advanced along an approximate serpentine path.

While I have shown and described a preferred embodiment of my invention it is to be understood that the apparatus and method are susceptible of obvious modifications all of which I contemplate within the spirit of the invention and the scope of the appended claims.

Having thus described my invention what I claim and desire to protect by Letters Patent is:

1. The method of manufacturing inner tubes comprising the steps, extruding inner tube stock in the form of a continuous tubular length, conveying the length of extruded stock in an approximate serpentine formation so as to maintain the tube in the form of an arcuate curve by suspending it in draped loops from successive points disposed at opposite sides of a vertical plane and advancing the tube past said points, and cutting the stock in unit lengths to form a completed annulus substantially free of stresses at the rim and tread region of the tube upon inflation sufficient to form a torus.

2. The method of manufacturing inner tubes comprising the steps, extruding inner tube stock in the form of a continuous tubular length, conveying the length of extruded stock in an approximate serpentine formation so as to maintain the tube in the form of an arcuate curve by suspending it in draped loops from successive points disposed at opposite sides of a vertical plane and advancing the tube past said points, cooling the stock while being conveyed, and cutting the stock in unit lengths to form a completed annulus substantially free of stresses at the rim and tread region of the tube upon inflation sufficient to form a torus.

3. The method of manufacturing inner tubes comprising the steps, extruding inner tube stock in the form of a continuous tubular length, conveying the length of extruded stock in an approximate serpentine formation so as to maintain the tube in the form of an arcuate curve by suspending it in draped loops from successive points disposed at opposite sides of a vertical plane and advancing the tube past said points, maintaining the tubular length of stock in a partially inflated state while being conveyed, and cutting the stock in unit lengths to form a completed annulus substantially free of stresses at the rim and tread region of the tube upon inflation sufficient to form a torus.

4. The method of manufacturing inner tubes comprising the steps, extruding inner tube stock in the form of a continuous tubular length, conveying the length of extruded stock in an approximate serpentine formation so as to maintain the tube in the form of an arcuate curve by suspending it in draped loops from successive points disposed at opposite sides of a vertical plane and advancing the tube past said points, cooling the stock while being conveyed, maintaining the tubular length of stock in a partially inflated state while being conveyed, and cutting the stock in unit lengths to form a completed annulus substantially free of stresses at the rim and tread region of the tube upon inflation sufficient to form a torus.

5. The method of producing curved tubular stock of plastic composition comprising the steps, continuously extruding a tube of the stock, and advancing the freshly extruded tube in a draped condition from one side to the other across a vertical plane along an approximate serpentine path so as to impart to the tube an arcuate contour that will cause it to assume readily the shape of an annulus.

6. The method of producing curved tubular stock of uncured plastic composition comprising the steps, continuously extruding a tube of the hot stock and imparting thereto an arcuate curvature, advancing this freshly extruded tube along an approximate serpentine path so that it travels back and forth in sagging loops that intersect a vertical plane and retains this arcuate curvature as it travels along said path, and cooling the tube as it travels along said path.

7. The method of producing curved tubular stock of plastic composition comprising the steps, continuously extruding a tube of the stock, and advancing the extruded stock in an approximate serpentine path back and forth over successive supports at points substantially diametrically opposed so that the stock travels indirectly in a longitudinal direction and sags in arcs that extend transversely to said longitudinal direction between the opposite supports, to thereby produce a change in the length of opposite walls of the tube and impart to the tube an inherent arcuate contour.

8. An apparatus for manufacturing inner tubes comprising, a tuber for extruding inner tube stock, and means associated with the tuber for supporting and advancing the tuber stock along an approximate serpentine path while maintaining the tube in an arcuate condition, including stock supporting rollers disposed along a zigzag path so that the axes of these rollers intersect a central vertical plane and the rollers serve to support and advance the stock in successive arcs draped back and forth across said plane from one roller to another.

9. An apparatus for manufacturing inner tubes comprising, a tuber for extruding inner tube stock, and means associated with the tuber for supporting and conveying the tuber stock while maintaining the stock in an arcuate and somewhat serpentine formation, including stock supporting tapered rollers disposed in rows on opposite sides of a central vertical plane, and means for driving these rolls to advance the stock back and forth across said plane in draped loops between the rollers.

10. An apparatus for manufacturing inner tubes comprising, a tuber for extruding inner tube stock, and means associated with the tuber for supporting and advancing the tuber stock along an approximate serpentine path while maintaining the tube in an arcuate condition, including stock supporting rollers disposed in rows on opposite sides of a central vertical plane to support and advance the stock in successive arcs draped between the rollers across said plane, means for driving said rollers, and means at the tuber for inflating the tuber stock.

11. The method of manufacturing inner tubes comprising the steps, extruding inner tube stock in the form of a continuous tubular length, conveying the length of extruded stock in an approximate serpentine formation so as to maintain the tube in the form of an arcuate curve having the radius of the finished inner tube by suspending it in draped loops from successive points disposed at opposite sides of a vertical plane and advancing the tube past said points, to thereby impart to this tube an inherent arcuate contour corresponding to that of the finished inner tube.

DORR J. HINMAN.

REFERENCES CITED

The following references are of record in the file of this patent:

UNITED STATES PATENTS

| Number | Name | Date |
|---|---|---|
| 1,196,648 | Bleecker | Aug. 29, 1916 |
| 1,674,574 | Semple | June 19, 1928 |
| 1,792,316 | Leguillon | Feb. 10, 1931 |
| 1,903,622 | Henderson | Apr. 11, 1933 |
| 2,070,252 | Borner | Feb. 9, 1937 |